Filed July 26, 1956

DATA PROCESSING TECHNIQUES

2 Sheets-Sheet 1

INVENTOR
CHARLES HIEKEN
BY Joseph Weingarten
ATTORNEY

INVENTOR
CHARLES HIEKEN
BY Joseph Weingarten
ATTORNEY

United States Patent Office 2,936,444

Patented May 10, 1960

2,936,444

DATA PROCESSING TECHNIQUES

Charles Hieken, Madison, Ill., assignor, by mesne assignments, to Laboratory For Electronics, Inc., Boston, Mass., a corporation of Delaware Application July 26, 1956, Serial No. 600,220

6 Claims. (Cl. 340—174)

The present invention relates in general to data storage systems and in particular to a novel system for recording and reading out digital data in a magnetic storage medium to effect the recording of a relatively high quantity of digital data in a relatively small portion of the magnetic medium in a manner whereby the stored data may be unambiguously recovered without reference to any external clocking means. Apparatus for implementing the novel system admits of relatively simple instrumentation of both recording and readout circuits, the self-clocked readout system providing a positive indication of the presence and value of a recorded digit.

In prior art storage systems employing a magnetic recording surface disposed upon a tape, rotating drum, or the like, it has been the custom to record digital data upon information tracks in a manner whereby relative motion imparted between the recording medium and a readout head induces a readout signal from the latter whereby a first binary digit is represented by a signal having a first polarity portion followed by a portion of second polarity opposite to the first polarity during a digit period. Conversely, a second binary digit is indicated by a second polarity portion followed by a first polarity portion during the digit period.

At relatively low packing densities, a system for interpreting such a readout signal is effective in providing an accurate rendition of the recorded data by sampling the readout signal during time intervals determined by timing pulses which are normally derived by similarly scanning a clock track on the recording surface having a timing signal there recorded which bears a fixed relation to the recorded data signal on the information track. As the packing density increases, however, certain stored digit patterns result in a readout signal which yields an inaccurate indication of the recorded digit when interpreted by conventional systems. To a large extent, this limitation results from wide peak-to-peak amplitude fluctuations in the readout signal when a series of random digits has been recorded. This effect is fully described in the co-pending application of Paul A. Husman, entitled Data Processing Apparatus, Serial No. 448,590, filed August 9, 1954, now Patent No. 2,896,192, dated July 21, 1959, which discloses a novel system for markedly increasing the amount of digital data which could be packed into a given portion of a magnetic recording surface. In fact, the improvement was so marked that the mechanical alignment between information and clock track becomes undesirably critical and difficult to maintain.

A self-clocked readout system has been described in the co-pending application of Harrison W. Fuller and Robert C. Kelner, entitled Data Processing System, Serial No. 505,894, filed May 4, 1955. With this readout system, packing densities of 1000 bits per inch were attained with reliable readout.

A limitation of prior art recording in readout systems with respect to stored digital data, is that reliable operation is limited to the recording and readout of binary digits. Since most digital storage devices are employed in cooperation with computers which operate only on binary numbers, this limitation has not been serious. However, the desirability of having a storage system capable of accommodating other than binary numbers and the consequential increase in information bits which may be stored still remains.

Consequently, it is a primary object of the present invention to provide a method of recording digital data in a magnetic medium whereby the data so recorded may be unambiguously recovered without reference to external timing signals.

It is another object of the invention to achieve the foregoing object and further permit the recording and recovery of digital data which is represented by digits having a plurality of integral values.

Still another object of the invention is to provide a method for recording digital data in a magnetic medium whereby the readout signal derived from the recorded data is relatively free of fluctuations in the peak-to-peak amplitude, thereby effecting an increase in the packing density of recoverable stored data.

A still further object of the invention is to provide a self-clocked readout system which unambiguously indicates the presence and nature of a recorded digit without any limitations whatsoever as to the presence or absence of digits recorded in adjacent spaces, or their value, if present.

Another object of the invention is to provide a system for recording digital data in accordance with the foregoing objects which is reliable and employs a relatively few number of components.

Still a further object of the invention is to provide a reliable readout system having relatively few components, and yielding an indication of the presence and value of each recorded digit in accordance with the foregoing objects.

Still another object of the invention is to provide a data storage system having readout means which provides a readout signal in a manner which permits verification of the accuracy of the readout data.

In a broad form, the method for recording digital data comprises the steps of magnetizing first and second spots in an opposite sense whereby the spacing between the spots is indicative of the digit recorded. The novel readout method includes the steps of scanning a magnetic medium thus magnetized and interpreting a readout signal thereby derived having first and second alternating polarity reversals to provide a signal indicative of the time relation of said second polarity reversal relative to the preceding first polarity reversal, the latter signal characterizing the digit represented by the related first and second polarity reversals.

In a more specific form, the invention is concerned with the recording and readout of digital data in a magnetic storage medium. Digital data is meant to include any information which may be characterized by a number comprising one or more digits, each digit taking a selected one of a plurality of values. Data is recorded by imparting relative motion between the magnetic medium and a recording head. The latter head is adapted to be energized with an input signal capable of magnetizing the medium in first and second opposite senses. Each digit is recorded by energizing the head with a first input signal, effective in magnetizing the magnetic medium in the first sense, followed by a second input signal effective in magnetizing the medium in the second sense. Means are provided for selecting the time interval between said first and second input signals, the selected interval being characteristic of the value of the recorded digit.

Recovery of the recorded data is effected by imparting relative motion between the magnetized portions of the magnetic medium and a reading head to derive a readout signal, it being understood that the same head or separate heads may be used for recording and readout. The readout signal so derived has first and second polarity reversals of opposite sense, the time interval measured from the second polarity reversal to the preceding first polarity reversal being characteristic of the value of the recorded digit. Means are provided for deriving an indication of the latter time interval for each pair of polarity reversals, thereby providing an output signal characteristic of the recorded data.

A representative embodiment of apparatus for recording digital data in accordance with the invention includes a rotating magnetic drum whose surface is adapted to be magnetized in first and second opposite senses by a recording head in response to positive and negative current pulses applied thereto from a writing amplifier in response to positive and negative input pulses respectively. The writing amplifier is energized by a buffer which has one input energized by positive pulses from a pulse source. The positive pulses from the pulse source are also inverted and applied to a delay line having a plurality of outputs, each providing a different delay. Switching means are provided for coupling a selected delay line output to another input of the buffer. Thus, the writing amplifier is first energized by a positive pulse and a selected time later by a negative pulse, the time interval therebetween being characteristic of the value of the digit thereby recorded.

A representative embodiment of a readout system for recovering the recorded data includes a readout head for scanning the magnetized portions of the rotating drum to derive a readout signal characteristic of the recorded digits and having first and second polarity reversals. The readout signal is clipped and differentiated to provide first and second crossover pulses respectively characteristic of the occurrence of the first and second polarity reversals. The first crossover pulses are utilized as a timing signal and applied to a first gate to initiate the generation of a first gating pulse of a first predetermined duration. For each digit value there is a gate having at least two inputs with one energized by the second crossover pulses, utilized as a data signal, and the second by a gating pulse from an associated gate generator. The second gate generator is energized by the first gate generator whereby termination of the first gating pulse initiates generation of the second gating pulse, the latter pulse being applied to the other input of the second gate. In general, the gate generator $n$ is triggered by termination of the gating pulse from the preceding gate generator. Thus, the gate energized simultaneously by a second crossover pulse and a gating pulse from its associated gate generator is the only gate to provide an output pulse. The gate so energized is indicative of the digit characterized by the time interval between the second crossover pulse and the preceding first crossover pulse; and hence, the corresponding recorded digit.

Other features, objects and advantages of the invention will become apparent from the following specification when read with reference to the accompanying drawing in which.

Figure 1:
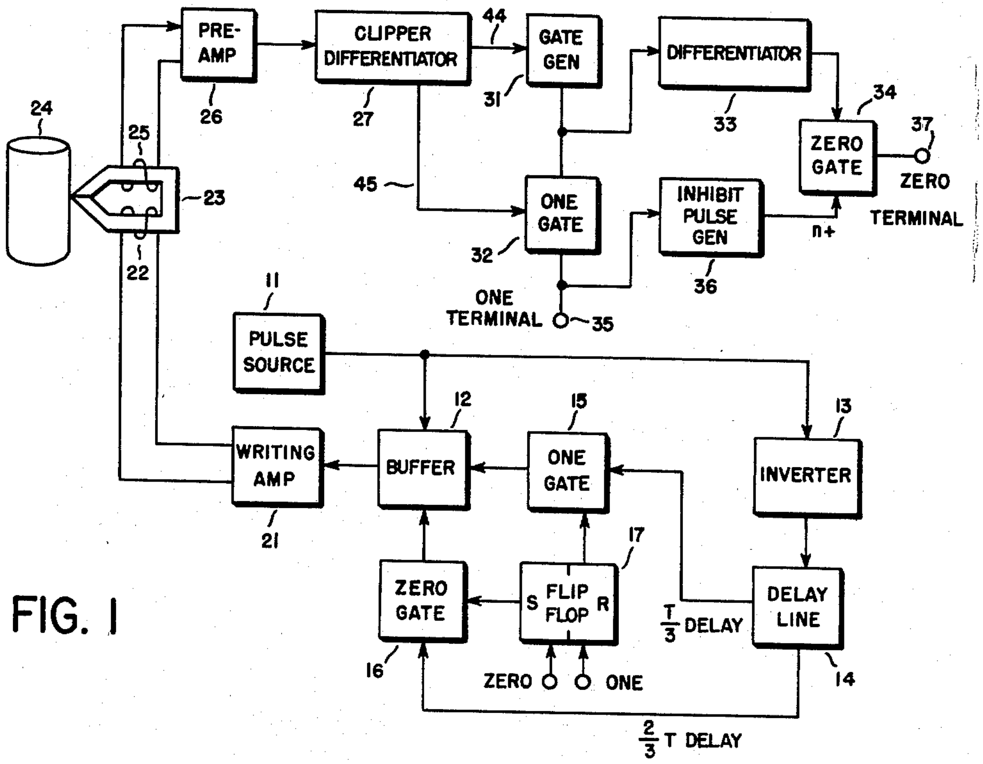
Fig. 1 is a block diagram of apparatus embodying the novel recording and readout techniques in connection with the storage of binary digital data.

With reference now to the drawing, and more particularly Fig. 1 thereof, a preferred embodiment of the novel digital data storage system is illustrated for accommodating the recording and recovery of binary digital data. The mode of operation of the system will be better understood after a description of the system arrangement.

The recording system is seen to comprise a pulse source 11 which energizes both a buffer 12 and a polarity inverter 13. The signal from pulse source 11, inverted in polarity by inverter 13, is applied to delay line 14 having first and second outputs which delay input pulses by a period $$\frac{T}{3} \text{ and } \frac{2T}{3}$$

respectively and are coupled to One gate 15 and Zero gate 16 respectively. The S and R outputs of flip-flop 17 are respectively coupled to the gates 15 and 16 respectively, thereby allowing only one of the latter gates to be open at a time, in accordance with the selection for recording of a Zero or One by appropriate energization of the Zero and One terminals of flip-flop 17. The outputs of gates 15 and 16 are coupled to buffer 12 and the output of the latter applied to writing amplifier 21 which energizes recording winding 22 of head 23 with oppositely polarized current pulses to magnetize the recording surface on magnetic drum 24.

To recover the recorded data, a readout signal is derived across readout winding 25 of head 23 and applied for amplification to preamplifier 26, the output signal from the latter being clipped and differentiated to provide positive and negative pulses for respective application by lines 44 and 45 to gate generator 31 and One gate 32 respectively. The gating pulse from gate generator 31 is applied to One gate 32 and differentiated by differentiator 33, pulses thereby derived being applied to Zero gate 34. A gating pulse from gate generator 31 and negative pulse from clipper differentiator 27 applied coincidentally to One gate 32 provide an output pulse on One terminal 35, indicating readout of the binary digit One. The output pulses of gate 32 are applied to inhibit pulse generator 36 which responds by generating an inhibiting pulse for application to Zero gate 34 to prevent the pulse derived from differentiating the trailing edge of the gating pulse from appearing on Zero terminal 37 when a One has been read out. Conversely, when a One has not been read out, no inhibiting pulse is generated, and the last mentioned pulse from differentiator 33 appears on terminal 37 indicating that a Zero has been read out.

Having thus described the system arrangement for recording and reading out binary digital data, it is now appropriate to discuss the mode of operation. This will be better understood by referring to the graphical representation of pertinent signal waveforms, plotted as a function of time in Fig. 2. For illustrative purposes, it is assumed in this example that the binary digits to be recorded are those designated in Fig. 1A in that sequence and the time interval between the recording of digits is designated T. While it is often desirable to record digits at regular intervals, it is to be understood that the novel system is not so limited. Quite to the contrary, digits may be recorded at completely random intervals.

For periodically recording digits, pulse source 11 generates one pulse per period T as indicated in Fig. 2B. These pulses are inverted by inverter 13, and the inverted pulses applied to delay line 14. The inverted input pulses are delayed $$\frac{T}{3} \text{ and } \frac{2T}{3}$$

for application to One gate 15 and Zero gate 16 respectively, the two delayed waveforms illustrated in Figs. 2C and 2D respectively. The other inputs of the latter two gates are respectively energized by the reset and set inputs of flip flop 17. In this example, the latter gates are of the type which provide a negative pulse output when both inputs thereto are at a relatively low potential. Consequently, only one gate is open at a time, that gate being the one whose associated section of flip flop 17 is at a relatively low potential. Energization of the Zero input to flip flop 17 renders the set section conductive, resulting in application of a relatively low potential to Zero gate 16 and a relatively high potential to the input of One gate 15, thereby opening the former gate in response to selection of Zero as the digit to be recorded. In a similar manner, One is selected for recordation by energizing the One input terminal of flip flop 17. The output of reset and set sections of flip flop 17 applied to the latter gates are designated data gating pulses and illustrated in Figs. 2E and 2F respectively for recording the digit sequence of Fig. 2A.

Thus, the output of buffer 12 is a pair of oppositely polarized pulses for each digit to be recorded, the spacing therebetween being relatively close for a One, and relatively wide for a Zero. These pulse pairs are amplified by writing amplifier 21 and applied in the form of current pulses, illustrated in Fig. 2J, to winding 22 of head 23 to record digital data on the surface of drum 24, moving relative to head 23, by magnetizing in opposite sense closely spaced spots for each One, and widely spaced spots for each Zero.

Having described the mode of operation for recording the digital data, system operation for reading out the recorded data will now be discussed. In describing the readout system, it is convenient to use as an example the readout signal which would be derived from the sequence of digits of Fig. 1A recorded in the manner described above. Accordingly, the signal waveforms in Figs. 2K through 2R are arranged to coincide with the digit period in which the sequence of Fig. 2A was recorded.

In Fig. 2K a readout signal derived from such a sequence is illustrated. Several salient characteristics of the readout signal are worthy of mention. The signal there illustrated has positive-going polarity reversals 41 which are regularly spaced, each followed by either a close-following negative-going polarity reversal 42 or a widely-spaced negative-going polarity reversal 43, respectively corresponding to readout of binary digits One and Zero. Although in this example the positive-going polarity reversals are regularly spaced, it will become evident from the discussion which follows that the system is reliably operative despite wide fluctuation in such time intervals. It is also to be observed that the peak-to-peak amplitude fluctuation in the readout signal is negligible. Furthermore, the nature of the system is such that the D.-C. level of the readout signal remains at substantially zero no matter what the packing density or the digit sequence recorded. This obtains because adjacent magnetized spots are magnetized to substantially the same extent but opposite in sense with each spot magnetized by a negative recording pulse (Fig. 2J) sandwiched by one widely-spaced and one closely-spaced spot magnetized by a positive recording pulse. The readout voltage derived across winding 25 as head 23 scans the recording surface on drum 24 is proportional to the rate of change of flux across the head; hence, the voltage derived when scanning an area between two widely-spaced spots is slightly smaller than when scanning two which are closely-spaced. But since scanning of a region enclosed by two widely-spaced spots is always followed by scanning a region bounded by closely-spaced spots, the average level of the readout signal will remain substantially zero from digit period to digit period.

As indicated above, the delay imparted to the inverted timing pulses is $$\frac{T}{3} \text{ and } \frac{2T}{3}$$

when recording the digits One and Zero respectively. While other periods may be employed within the scope of the invention, additional advantages are inherent with the selection of the indicated delay intervals. Note that with this selection, the closest spacing between polarity reversals is substantially $$\frac{T}{3}$$

polarity reversals 42 and 43 respectively following and preceding an adjacent polarity reversal 41 by substantially that amount. Accordingly, the packing density in the magnetic medium is then limited only by a minimum wavelength which permits resolution of the magnetized spots corresponding to a scanning interval of $$\frac{T}{3}$$

Selection of other delay intervals would result in a reduction in spacing between some alternate polarity reversals with a corresponding reduction in the packing density of the storage medium.

Figure 2:
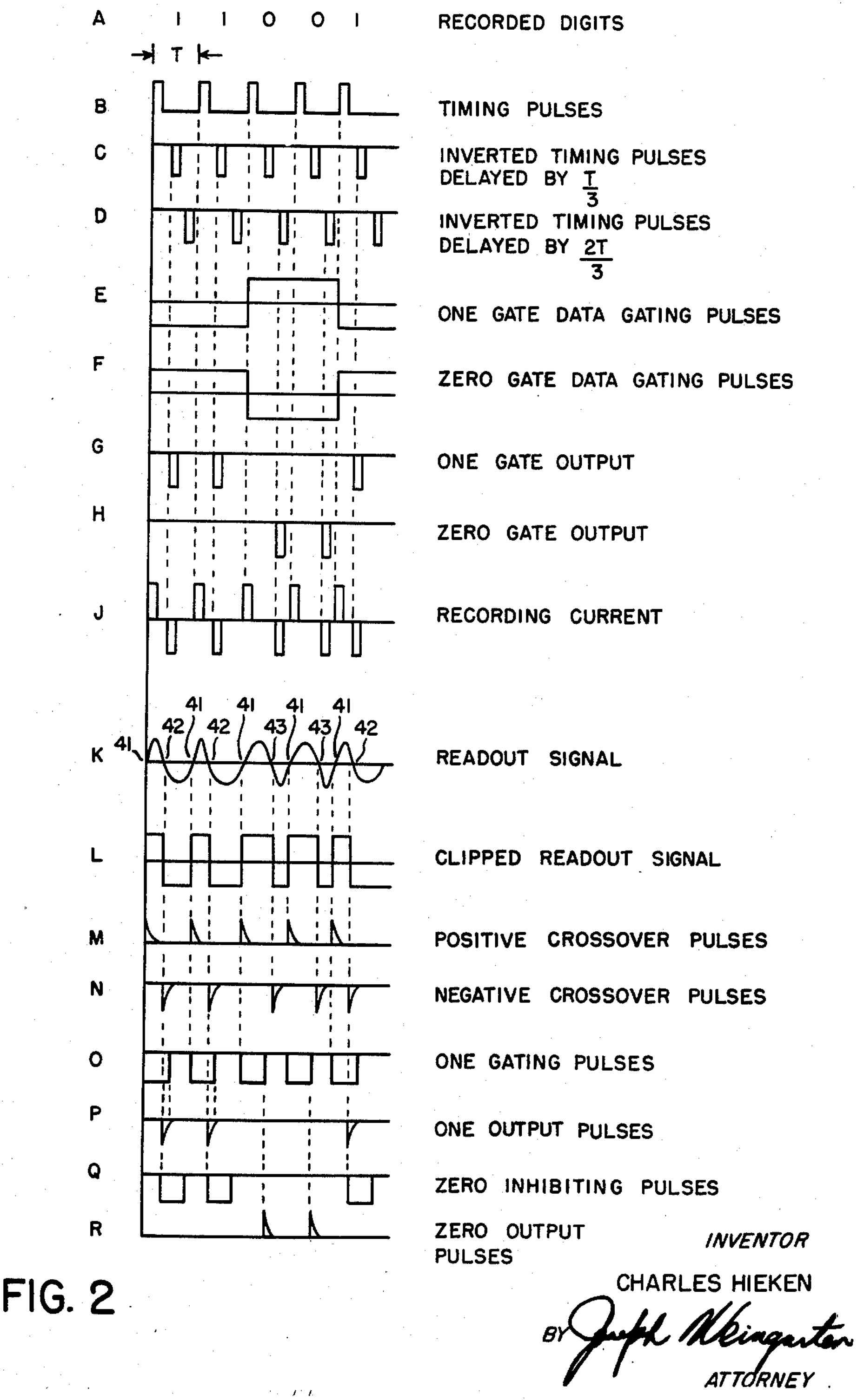
Fig. 2 is a graphical representation of signal waveforms pertinent to the understanding of the operation of the apparatus of Fig. 1.

The readout signal is amplified by preamplifier 26 and applied to clipper differentiator 27, the clipped readout signal being illustrated in Fig. 2L. The latter signal is differentiated in clipper differentiator 27 to provide on line 44 positive crossover pulses (Fig. 2M), related to the positive crossovers 41 and on line 45 negative crossover pulses (Fig. 2N), related to negative crossovers 42 and 43 as indicated in Fig. 2.

The positive crossover pulses are applied to gate generator 31 as trigger pulses, thereby initiating the indicated negative gating pulses illustrated in Fig. 20, which are applied to One gate 32, the latter also being energized by the negative crossover pulses of Fig. 2N. Whenever One gate 32 is energized simultaneously by a gating pulse and negative crossover pulse, a One output pulse appears on One terminal 35, thereby indicating a One has been read out. Accordingly, as illustrated in Fig. 2P, One output pulses are derived during the first, second and fifth digit periods, signifying readout of the One's in the sequence of Fig. 2A. The One gating pulses are in this example of duration $$\frac{T}{2}$$

however, other durations may be selected so long as the selected duration is long enough to cover generation of a negative crossover pulse corresponding to the binary digit One, and short enough to exclude passage by the One gate 32 of the negative crossover pulses which correspond to the binary digit Zero. Thus, it is seen that the negative crossover pulse corresponding to a one need not occur an interval which is precisely $$\frac{T}{3}$$

after the preceding positive crossover pulse for recignition of the digit One, and the interval between negative crossover pulses corresponding to the digit Zero and preceding positive crossover pulses may fluctuate from $$\frac{2T}{3}$$

without causing the apparatus to erroneously indicate readout of the binary digit One.

The One output pulses are applied to inhibiting pulse generator 26 which provides a negative inhibiting pulse, preferably of duration $$\frac{T}{2}$$

in response to each output pulse (Fig. 2Q). Differentiator 33 is energized by gating pulses from gate generator 31 to provide negative and positive pulses coincident with the leading and trailing edges respectively of the latter gating pulses. The Zero gate 34 is of a type which provides an output when both inputs thereto are at a predetermined positive potential. The input energized by inhibiting pulse generator 36 is normally positive as indicated by the designation $n+$. Thus, when no inhibiting pulse is generated each positive pulse from differentiator 33, coincident with the trailing edge of the one gating pulses, appears on terminal 37, indicating that a Zero has been read out. However, when a One has been read out, an inhibiting pulse is generated by generator 36, thereby lowering the potential on the normally positive input to Zero gate 34 whereby the positive pulses from differentiator 35 are precluded from appearing on output terminal 37.

Among the advantages of this arrangement is the derivation of Zero output pulses at time intervals relative to the positive crossover pulses which are only slightly different from the intervals separating the one output pulses, thereby facilitating the ease with which the read out data may be synchronized for use in an associated computing system.

The readout system described above is seen to yield an unambiguous indication of the presence and value of a recorded binary digit. An output pulse will be derived only if the portion of the recording surface then scanned by reading head 23 has there recorded a binary digit. The value of each digit is contained in the immediate area where recorded, without reference to any external clocking source. While it is desirable to have binary digits recorded on the entire track scanned by the head, the apparatus will still respond to isolated digits there stored; it being understood that the readout signal may be of lesser amplitude since the flux change will initially be from zero to a value of a first sense, rather than from a value of opposite sense to said first sense. This may be readily overcome by applying a biasing current to the recording winding 22 whereby the recording surface is magnetized in the negative sense when digits are not being recorded. Thus, when an isolated digit is recorded it will affect a flux change from the negative sense to the positive sense, the biasing current returning the medium to the negative sense The read out signal derived therefrom will then be of the same peak-to-peak value derived when scanning a whole chain of recorded digits.

While the representative embodiment described herein recovers the recorded data by sensing the spacing between timing and data pulses respectively derived from first and second alternating polarity reversals in the readout signal, sampling techniques may also be employed. For example, the positive crossover pulses of Fig. 2M may be delayed by $$\frac{T}{2}$$

and utilized as sampling pulses when applied to a coincidence gate along the clipped readout signal of Fig. 2L. Thus, the latter waveform is effectively sampled $$\frac{T}{2}$$

after the positive-going crossovers, One's and Zero's being indicated respectively by negative and positive samplings at this time.

Figure 3:
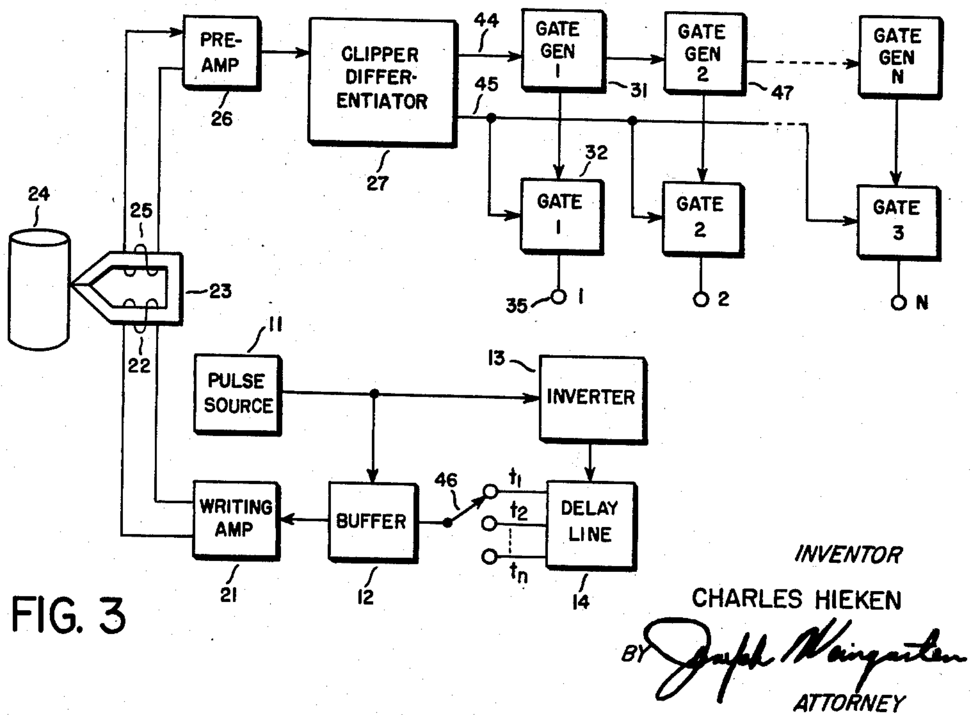
Fig. 3 is a block diagram of apparatus also suitable for recording and reading out of digital data represented by numbers of higher radix than binary.

With reference now to Fig. 3, there is illustrated a block diagram of a system suitable for recording and reading out digital data whereby each digit may assume $n$ values. The basic difference between this method and the method utilized in connection with the binary storage system described above, is that the interval after first polarity reversals is divided into $n$ regions whereas in the aforesaid binary system the corresponding interval is divided into only two regions.

Thus, occurence of the negative polarity reversal in the first region corresponds to readout of a digit having a first value while, in general, occurrence of the crossover in the $n$'th region corresponds to readout of the $n$'th value of the digit.

The recording apparatus of Fig. 2 is modified in Fig. 3 to permit the recording of $n$ digit values by providing delay line 14 with $n$ output taps each introducing a different delay from $t_1$ to $t_n$, each tap being related to one of the $n$ digit values. The digit to be recorded is selected by moving switch 46 to the proper tap on delay line 14 so that buffer 12 is energized both by the positive pulse from source 11 and by the delayed pulse from the delay line 14 having a delay related to the digit value sought to be recorded whereby writting amplifier 21 provides the properly spaced current pulses of opposite polarity for recording the selected digit value upon drum 24 in the same manner as described above.

Readout is essentially as described above in connection with the binary system up to gate generator 31 and gate 32. To render the system sensitive to the selection of the proper interval in which the negative polarity reversal occurs, the system illustrated in Fig. 3 is utilized. For each value a digit may take, there is provided a gate generator and an associated gate. The first gate generator 31 is energized by the positive crossover pulses from line 44 as in the above system to provide a gating pulse of duration substantially $$\frac{T}{n}$$

where T is the digit period. Each of the other gate generators provide a gating pulse preferably of a like duration; however, the pulse is initiated by the termination of the gating pulse from the preceding gate generator. For example, when the gating pulse from generator 31, terminates, the pulse of the second gate generator 47 commences, termination of the latter pulse initiating the generation of the gating pulse in the following stage. With this arrangement only one of the $n$ gates is open at a time. Note that the second input to each gate is simultaneously energized by the negative crossover pulses from line 45; however, only the gate then energized by its associated gate generator will provide an output pulse in response to a negative crossover pulse, thereby signifying the digit value read out. Hence, the readout system will unambiguously indicate the presence and value of the recorded digit. The advantages of being able to reliably record and readout digital data represented by multiple valued digits are apparent. For example, this arrangement may be utilized for storing and recovering decimal numbers directly in decimal form without resorting to encoding and decoding techniques. It is also useful for directly storing quantized sampled values of an analog signal.

The invention has been described with respect to data arranged in periodically spaced digit periods; however, the system is equally operable when the digit periods are aperiodically spaced. For example, when recording data, once the second pulse has been recorded, it is only necessary to wait the shortest interval between pulses $$\left(\frac{T}{3}\right.$$

in the first-described example) before commencing to record the next binary digit. And the binary readout systems disclosed above will respond to digits so recorded without any changes whatsoever. Thus, the packing density of the magnetic recording medium is further enhanced when aperiodic techniques are employed. When the readout system of Fig. 3 is employed to read aperiodically stored digital data, each digit capable of assuming $n$ values, means may be provided for inhibiting the propagation of gating pulses when the negative crossover pulse is gated out by the activated gate. This is readily accomplished by employing buffer means with separate inputs coupled to each gate output terminal to couple each gate output pulse to the inputs of its associated gate generator, and the gate generator following. This terminates the contemporary gating pulse and prevents the following stage from generating a gating pulse in response to such termination.

While the system as disclosed is operative with a high degree of reliability, verification of the accuracy of readout data may be readily determined. For example, a Zero flip flop might be set by a Zero pulse from terminal 37 and reset by the negative crossover pulses on line 45, and output pulses derived from the latter flip-flop utilized as an indication that the digit Zero has been read out. A short pulse will be derived therefrom only when a Zero output pulse (Fig. 2R) is followed by a negative crossover pulse (Fig. 2N). Derivation of a long pulse therefrom may be utilized as an indication that the digit then read out is of doubtful accuracy.

Numerous modifications of and departures from the particular embodiments described herein may be practiced by those skilled in the art without departing from the inventive concepts disclosed herein. Consequently, the invention is to be construed as limited only by the spirit and scope of the appended claims.

What is claimed is:

1. Apparatus for recording digital data in a magnetic medium comprising, a magnetic medium and recording head with means for imparting relative motion therebetween, a writing amplifier for energizing said recording head with a current of polarity indicative of the polarity of input pulses to the latter amplifier, a pulse source, delay means having an input coupled to said pulse source and a plurality of outputs each providing an output pulse delayed a different increment from the incident pulse coupled from said pulse source, means for selecting one of the delayed output pulses and coupling the selected pulse and the preceding input pulse to said writing amplifier whereby the latter two pulses are of opposite polarity and the time separation therebetween is characteristic of the digital data then recorded.

2. Apparatus for deriving an output signal characteristic of digital data stored in a magnetic medium comprising, a readout head, means for imparting relative motion between said readout head and said magnetic medium to derive a readout signal from said readout head having alternating first and second polarity reversals of opposite sense, means for clipping and differentiating said readout signal to derive first and second pulses respectively characteristic of said first and second polarity reversals, means for triggering with said first pulses a gate generator which provides a gating pulse for each first pulse, a first gate energized by said second pulses and gating pulses and providing a first output pulse indicative of readout of a first digit value when a second pulse occurs within the duration of a gating pulse, an inhibiting pulse generator which provides an inhibiting pulse in response to each first output pulse, means for differentiating said gating pulses and applying the differentiated gating pulses to a second gate which is also energized by said inhibiting pulses to provide a second output pulse indicative of readout of a second digit value when the trailing edge of a gating pulse occurs during the absence of an inhibiting pulse.

3. Apparatus for reading out digital data from a magnetic medium wherein the data is stored by adjacent spots residing in oppositely sensed magnetic states and spaced apart by a distance characteristic of the digits there recorded comprising, a readout head, means for imparting relative motion between said medium and head to derive a readout signal from said readout head having first and second polarity reversals of opposite sense, means for deriving timing and data signals from the first and second polarity reversals respectively, a chain of $n$ gate generators the first of which responds to said timing signal to generate a gating pulse of a selected duration, the others responding to termination of the gating pulse generated by the preceding stage to generate a gating pulse of a selected duration, the sum of said selected durations being less than or equal to the time interval between said first polarity reversals, $n$ gates each with a first input respectively energized by a gating pulse from a respective one of said gate generators, and having a second input energized by said data signal to provide a signal output indicative of an associated digit having been read out when both inputs to the gate are simultaneously energized.

4. A decoding system for use with coded information of the type where the trailing edge of a pulse is spaced from the leading edge of the pulse by a distance which uniquely determines the coded information, comprising, means for obtaining a timing signal from the leading edge of said pulse and an information signal from the trailing edge of said pulse, a first generator, a first gate, said first generator in response to said timing signal supplying a gating signal of fixed duration to said gate, said first gate having said information signal applied to its input, said first gate providing an output signal upon the concurrence in time of said gating and information signals, a second gate, a second generator activated by an output signal from said first gate, said second generator when activated supplying an inhibiting pulse to said second gate, means for providing a second information signal at the conclusion of said gating signal and applying said second information signal to the input of said second gate, and said second gate in the absence of an inhibiting pulse providing an output signal in response to said second information signal.

5. A decoding system for use with coded information of the type where the time difference between a first pulse of one polarity and a second pulse of opposite polarity uniquely determines the coded information, comprising, a differentiator having said first and second pulses applied to its input, said differentiator deriving a timing signal from the leading edge of said first pulse and an information signal from the leading edge of said second pulse, a first generator for providing a gating signal of fixed duration in response to the impress of a timing signal, a first gate having said gating signal and said information signal applied as inputs, said first gate providing an output signal upon the concurrence in time of said gating and information signals, a second gate, a second generator activated by an output signal from said first gate, said second generator when activated supplying an inhibiting pulse to said second gate, means for providing a second information signal at the conclusion of said gating signal and applying said second information signal to the input of said second gate, and said second gate when not inhibited by an inhibiting pulse being arranged to provide an output signal in response to said second information signal.

6. Data coding apparatus for use with a recording mechanism of the type having a magnetic recording medium movable relative to a recording head comprising, a source of timing pulses, energizing means connected between said recording head and said source, said energizing means in response to a timing pulse causing said recording head to magnetically saturate said medium in one direction of magnetic polarity, pulse delay means coupled to the output of said source, information input means coupled to said delay means for selecting a signal pulse delayed from said timing pulse by a time uniquely representative of the input information, and means for applying said signal pulse to said energizing means to cause said recording head to magnetically saturate said medium in the other direction of magnetic polarity.

References Cited in the file of this patent

UNITED STATES PATENTS

| | | |
|---|---|---|
| 2,692,379 | Toth | Oct. 19, 1954 |
| 2,721,989 | Gates et al. | Oct. 25, 1955 |
| 2,796,596 | Kenosian | June 18, 1957 |
| 2,887,674 | Greene | May 19, 1959 |

UNITED STATES PATENT OFFICE

CERTIFICATE OF CORRECTION

Patent No. 2,936,444 May 10, 1960

Charles Hieken

It is hereby certified that error appears in the printed specification of the above numbered patent requiring correction and that the said Letters Patent should read as corrected below.

Column 6, line 54, for "recigni-" read -- recogni- --; column 7, line 53, after "along" insert -- with --; column 9, line 30, after "incident" insert -- input --.

Signed and sealed this 25th day of April 1961.

(SEAL)
Attest:

ERNEST W. SWIDER
Attesting Officer

DAVID L. LADD
Commissioner of Patents